July 5, 1932.  F. M. EATON  1,865,846
FRUIT PRESSING MACHINE
Filed July 25, 1928   5 Sheets-Sheet 5

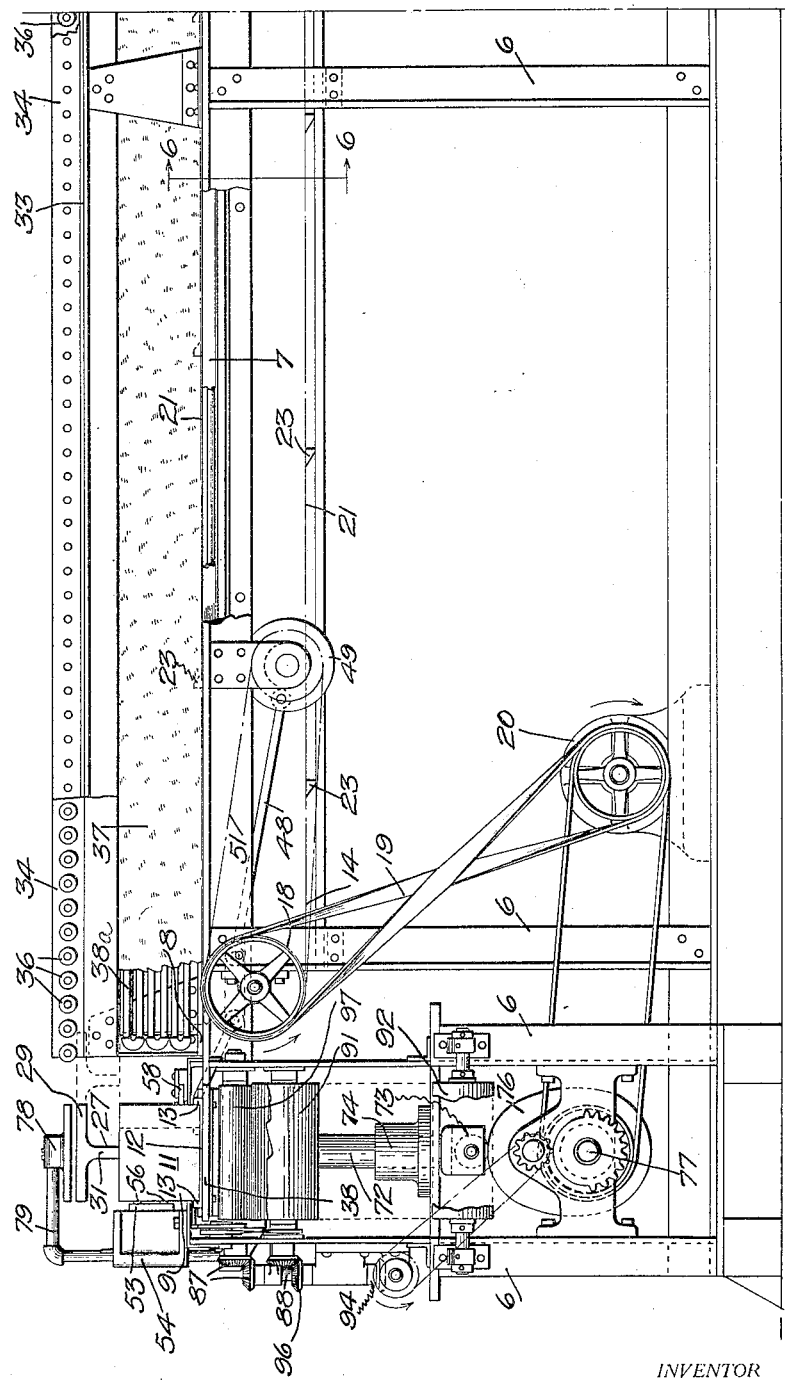

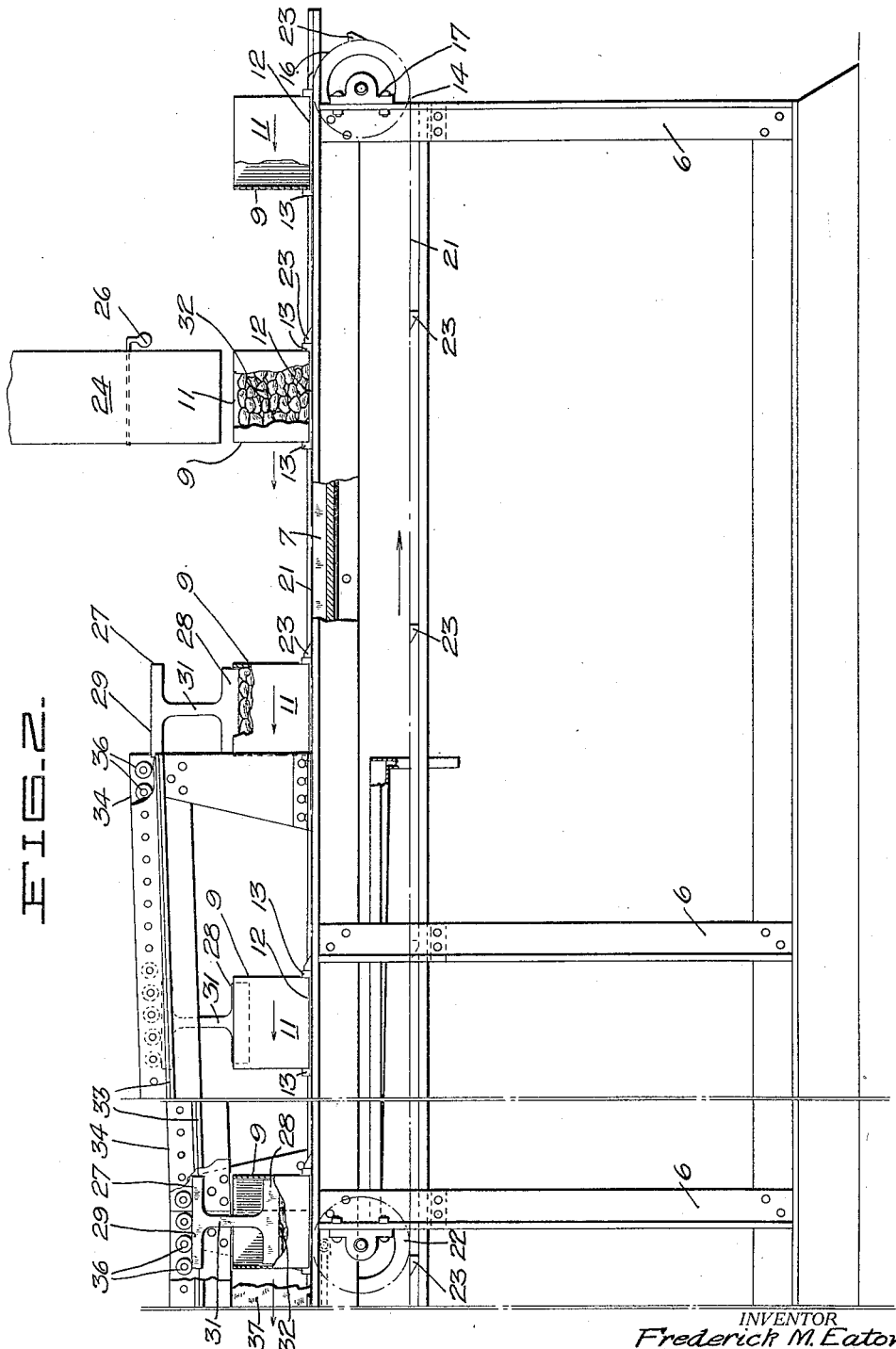

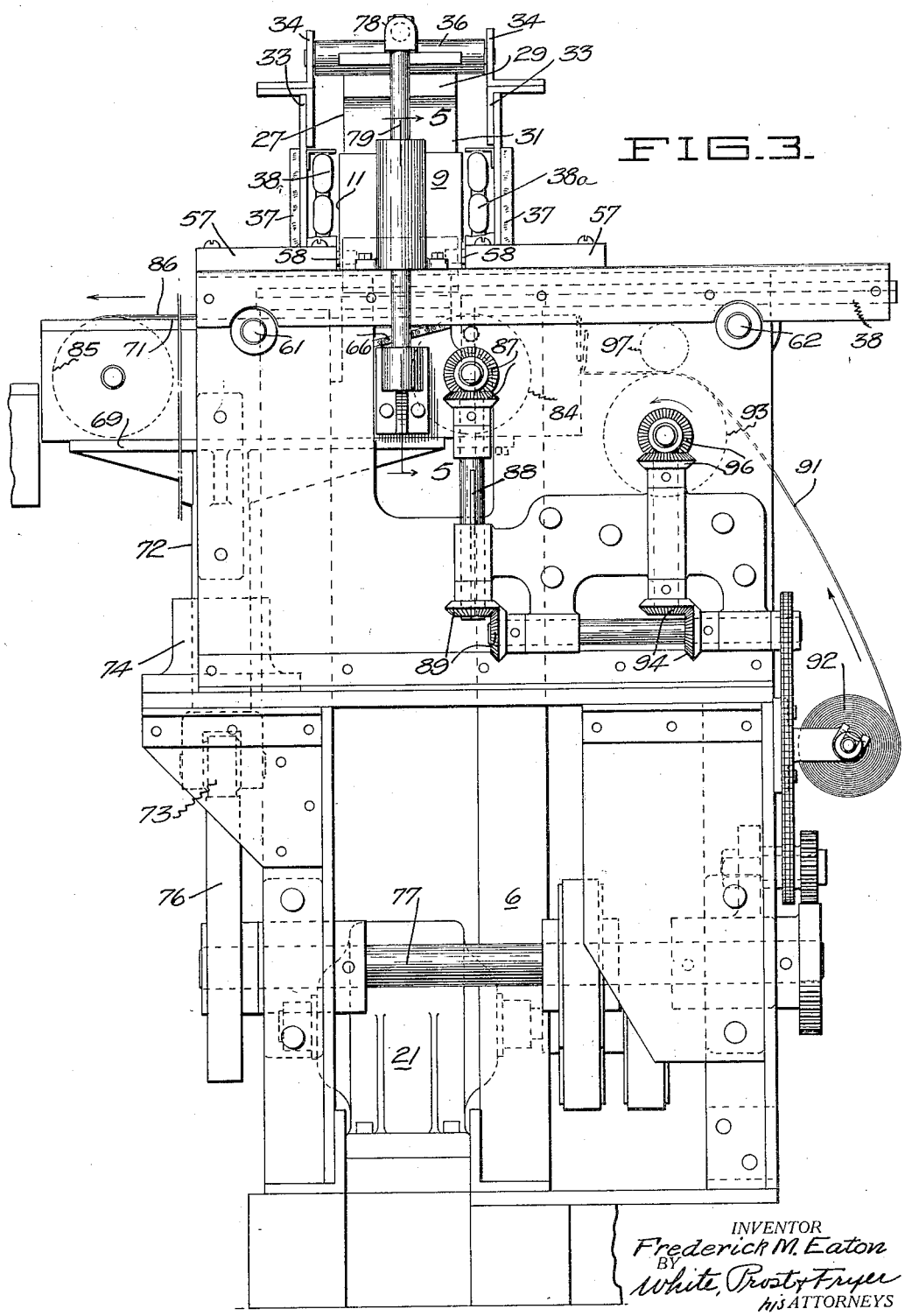

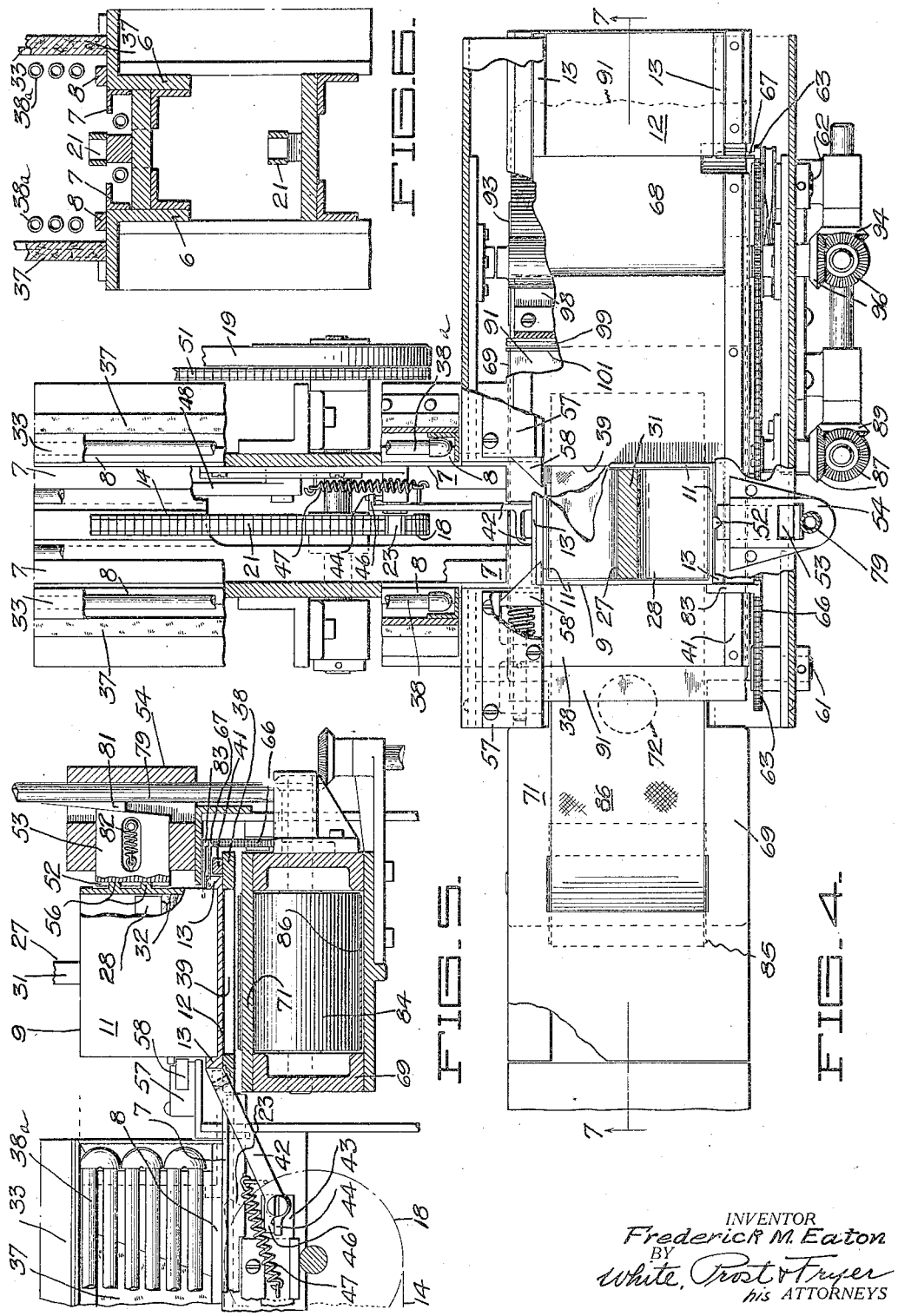

INVENTOR
Frederick M. Eaton
BY
White, Prost & Fryer
his ATTORNEYS

Patented July 5, 1932

1,865,846

UNITED STATES PATENT OFFICE

FREDERICK M. EATON, OF PALO ALTO, CALIFORNIA, ASSIGNOR TO ROSENBERG BROS. & CO., OF SAN FRANCISCO, CALIFORNIA, A CORPORATION OF CALIFORNIA

FRUIT PRESSING MACHINE

Application filed July 25, 1928. Serial No. 295,204.

My invention relates to machines for preparing fruit for packaging, and especially concerns the preparation of fruit such as prunes, which I have chosen to illustrate the functioning of my invention and its adaptation to fruit pressing, but it is of course applicable to other fruits and is not confined exclusively to use with prunes.

Prunes are now largely supplied to the consumer in small packages in which they are preferably compressed or compacted into a brick. This form is adopted as with it a large amount of material is encompassed in a small space. Preferably the pressed prunes are wrapped in air tight packages as they keep better and appeal more strongly to the consumer. It is advisable in preparing prunes to keep them as free from contamination as possible, not only to abide by the usual sanitary regulations but because even extraneous matter from the atmosphere can initiate spoiling in the prunes and cause thereby a considerable financial loss.

It is therefore an object of my invention to provide a fruit pressing machine which will handle the fruit out of contact with the atmosphere for substantially the entire pressing operation.

Another object of my invention is to provide a machine which will automatically press and deliver for wrapping bricks of fruit.

Another object of my invention is to provide a fruit pressing machine in which the fruit brick is handled so as not to be broken by jarring or sudden movement.

A further object of my invention is to provide means for discharging the pressed brick onto a sheet of wrapping material which facilitates the operation of the wrapping machine.

An additional object of my invention is to provide means for pressing fruit in which the pressing portions in contact with the fruit can be sterilized after each pressing operation.

My invention possesses other advantageous features, some of which with the foregoing, will be set forth at length in the following description where I shall outline in full that form of the fruit pressing machine of my invention, which I have selected for illustration in the drawings accompanying and forming part of the present specification. In said drawings I have shown one form of fruit pressing machine embodying my invention, but it is to be understood that I do not limit myself to such form since the invention, as set forth in the claims, may be embodied in a plurality of forms.

In the drawings:

Fig. 1 is a side elevation of the terminal portion of the fruit pressing machine of my invention, portions being broken away to disclose the interior mechanism.

Fig. 2 is a side elevation of the initial portion of the pressing machine, portions being broken away to disclose the construction.

Fig. 3 is an end elevation of the fruit pressing machine as shown in Figs. 1 and 2.

Fig. 4 is a plan of the portion of the machine as shown particularly in Fig. 1.

Fig. 5 is a cross section of the end of the machine, the plane of section being indicated by line 5—5 of Fig. 3.

Fig. 6 is a transverse section of the machine, the plane of section being indicated by the line 6—6 of Fig. 1.

Figure 7:
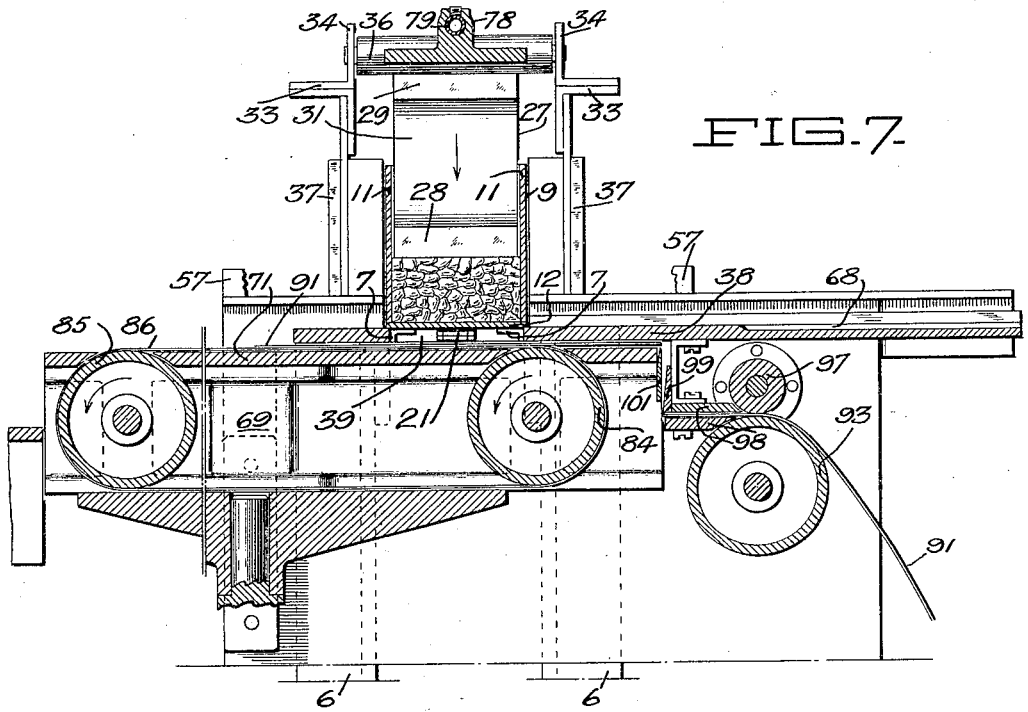
Fig. 7 is a cross section adjacent the table, the plane of section being indicated by line 7—7 of Fig. 4.
Figure 8:
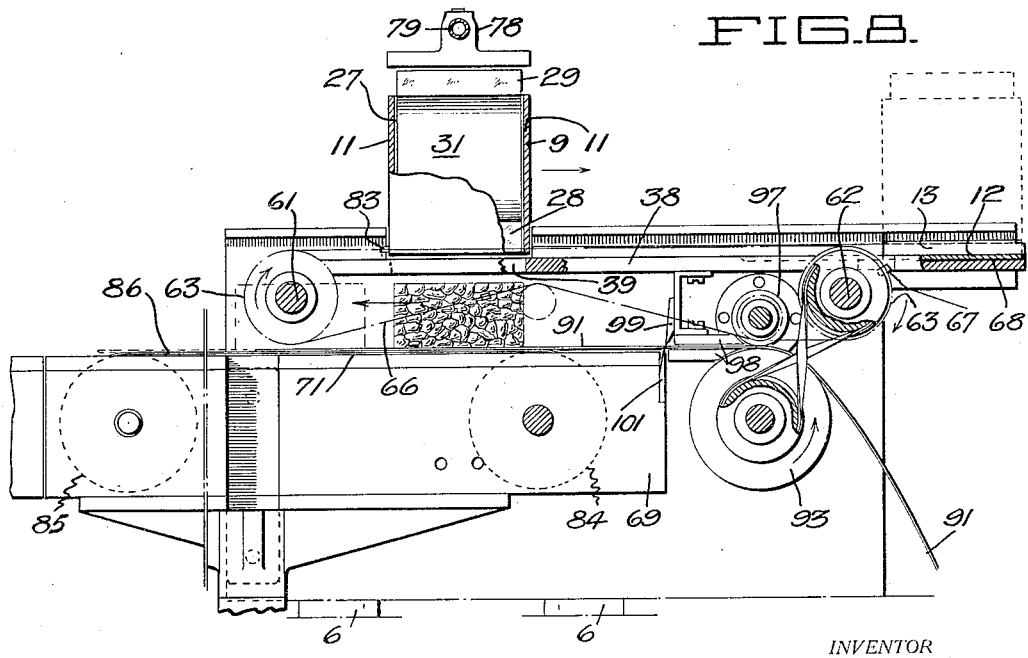
Fig. 8 shows the table in side elevation, with the discharged brick thereon, portions being indicated in section.

The fruit pressing machine of my invention preferably comprises a container in which the fruit is pressed and which is adapted to be disassembled for the removal of the fruit onto a sheet of wrapping material, together with suitable mechanism for conveying the container during the cycle of operations and for replacing the container in assembled position.

In the preferred embodiment of the invention disclosed in the drawings and in which the machine is shown as it is adapted for use with prunes, a framework 6 is provided preferably made of suitable shapes resting on a solid foundation. The framework supports a runway comprising angles 7 secured to the framework and which is bounded by rails 8 also secured to the framework. On the runway and adapted to fit between the rails 8 are containers 9 preferably of sheet metal. Each container comprises four walls 11 in rectangular relationship seated upon a bottom 12 also of metal and provided with end cleats 13 between which the walls 11 make a sliding fit. The bottom 12 rests directly upon the angles 7 with the cleats 13 disposed transversely of the machine.

In order to convey the container along the runway, a chain conveyor 14 is provided. The conveyor includes an end sprocket 16 journaled in a suitable bracket 17 on the framework 6 and a second sprocket 18 located at the remote end of the machine and supported on the framework. The sprocket 18 is suitably driven by a belt 19 from an electric motor 20 mounted on the framework and drives the chain 21 which is supported by the end sprockets 16 and 18 and by an intermediate idler 22. At intervals on the chain 21, lugs 23 are provided. These lugs are secured to the links of the chain and project a sufficient distance to engage the trailing cleat 13 of each container.

The containers are placed on the runway adjacent the initial end of the machine and are engaged by one of the lugs 23 passing around sprocket 16. Each container is advanced until it lies under a suitable filling spout 24 which depends over the machine and carries the fruit to be pressed. In the present instance, the filling spout is a tube having a manual control 26 for regulating the amount of fruit passing therethru, but the containers can, of course, be charged by hand or by any other suitable filling means. The fruit usually is somewhat moist and is at an elevated temperature as previous treatment usually comprises immersing it in boiling water. Most of the water is drained from the prunes prior to their introduction into the filling spout 24, but their temperature usually remains high for a considerable period.

After the container is carried from beneath the filling spout during the advance of the conveyor 14, it is provided with a plunger 27. The plunger is generally of I section. It preferably is made of metal and is provided with a piston face 28 adapted to fit closely within the container. The face 28 is connected to an upper face 29 by an intermediate web 31. The upper face 29 is preferably of such a width that it will rest on the upper edges of the walls 11 when the bottom of the piston face 28 is flush with the bottom of the walls 11.

As the container is nearly full of fruit 32 when the plunger is introduced, the plunger extends but a short distance below the rim of walls 11. Means are provided for depressing the plunger in the container as the conveyor 14 advances the container. As a part of the framework 6, a superstructure 33 is provided. The superstructure is also constructed of metal shapes and includes side rails 34 in which a plurality of rollers 36 are journaled. The side rails 34 are preferably inclined with respect to the runway 7 so that as the container 11 is advanced, the plunger 27 is brought into contact with the rollers 36 and is gradually depressed to force the piston face 28 to approach more closely the bottom of the container. The angle of the surface defined by the lower sides of the successive rollers 36 is preferably such that a considerable distance is required to effect the desired amount of depression of the plunger 27.

Preferably, means are provided for cooling the fruit as it is advanced and as it is pressed by the descending plunger. The sides of the super-structure 33 and the bottom of the runway 7 are enclosed by insulating material 37. If desired, the upper side of the rollers can also be enclosed by suitable heat insulating material. Within the enclosure so formed, coils 38a are installed which extend for a considerable proportion of the length of the machine. These coils contain a refrigerating solution which is effective in removing excess heat from the fruit 32. As the fruit is compressed to form a brick, it is considerably cooled which aids measurably in maintaining the shape of the fruit brick. By the time the conveyor has advanced the container 9 to the terminal end of the framework 6, the temperature of the fruit has been lowered appreciably and the plunger has been depressed to the fullest desired extent so that a compact brick of pressed fruit at a low temperature is formed within the container.

Adjacent the end of the framework 6 a platform 38 is provided. The platform preferably comprises a flat plate having a rectangular aperture 39 therein, the aperture being positioned in alinement with the runway 7 and also being of a size but slightly larger than the interior dimensions of the container 9. The lugs 23 on the conveyor 14 in rounding sprocket 18 discharge the containers 9 onto the platform 38, but inasmuch as nearly exact registration of the container and the aperture 39 is required, I provide additional means for positioning the container in registry with the aperture.

A stop 41 is secured to the upper side of the platform 39 against which the leading cleat 13 of the container 11 abuts. The container is forced against the stop 41 by a pair of fingers 42, pivotally connected to a reciprocating block 43 guided in the framework 6. The block carries a projection 44 against which a lug 46 on each finger 42 is urged by a coil spring 47. The fingers 42 are thus normally constrained to lie above the plane of the runway 7 but will permit the passage of a container thereover by being depressed for an instant. Reciprocation of the block 43 and the fingers 42 is effected by a pitman 48 pivotally connected to the block at one end and at the other end secured to a crank disc 49 journaled in the framework 6. A chain 51 drives the crank disc 49 and reciprocates the fingers 42 in time with the movement of the conveyor 14 so that as one of the lugs 23 disengages from its corresponding container 9, the fingers 42 over which the container has previously passed, engage the trailing cleat 13 and force the bottom 12 over the aperture 39 in platform 38 with the leading cleat 13 in abutment with stop 41. The interior of the walls 11 is therefore in correct longitudinal alinement with the aperture 39.

To insure perfect transverse alinement between the container and the aperture 39, and also to aid in preventing undesired movement of the container during subsequent operations, I have provided a keyway 52 cut in a latch 53 mounted in a housing 54 secured to the rear portion of the framework. The keyway is adapted to receive a key 56 formed on the leading side of the container 9. The key and keyway can be any cooperating interlocking means for positioning the container with respect to the platform 38 but in the present instance I have used two vertically alined nubs 56. The nubs are preferably conical fitting in a V-shaped keyway so that correct lateral alinement of the container 9 with the aperture 39 is assured. To maintain the container in position and also to prevent any twisting or retreating movement thereof a pair of latches 57 is provided. These latches are secured to the framework of the machine one at either side of the runway and preferably each includes a spring projected beveled lug 58 with which the container first contacts and depresses as it passes into position over the aperture 39. Once in position, the container has released the lugs 58 by having passed first beyond them, and they spring outwardly into normal position adjacent the rear face of the container 9. The container is then securely held in registered position directly over the aperture 39.

In order to remove the brick of pressed fruit from the container I preferably strip off the bottom 12. Arranged on the platform 38 is a pair of cross shafts 61 and 62, respectively, which are journaled in the framework 6. Each of the shafts 61 and 62 carries adjacent its extremities sprockets 63. The pairs of sprockets engage a pair of conveyor chains 66, extending transversely of the machine. The conveyor chains are made with two series of projecting pins thereon. The first series comprises pins 67 projecting inwardly from the conveyor chains a sufficient amount to engage only the leading and trailing cleats 13. The conveyor chains 66 are so driven in relationship to the operation of the fingers 42, that just after the container is properly positioned and held over the aperture 39 the advancing fingers 67 engage the bottom 12 and strip it from beneath the sides 11. The bottom is carried by the fingers 67 to one side of the framework 6, to the right in Figs. 4 and 7, and enters a depressed portion 68 of the platform 38. This leaves the brick of fruit 32 unsupported within the container 9 except by its adherence to the side walls thereof.

The brick of pressed fruit is received on a table 69 fabricated from metal shapes and including a surface 71 underlying the aperture 39. The table as a whole is mounted on a column 72 carrying a cam roller 73 at its lower end. The column passes thru a collar 74 firmly supported on the framework 6 and is arranged to prevent rotation of the table. The cam roller 73 follows the contour of a cam 76 mounted on a shaft 77 journaled in the framework. The table therefore is reciprocated in conformity with the contour of cam 76 and is timed to be in upper position immediately below the aperture when the bottom 12 is stripped from the container.

To dislodge the brick of pressed fruit from the container 9, a driver 78 is provided which comprises a pad affixed to an arm 79 secured firmly to the table 69 and moved in unison therewith. As the cam 76 rotates, it permits the table to lower bringing driver 78 with it. The driver contacts with the extending plunger 27 which is further depressed in the container 9 and drives the brick of pressed fruit before it. It is expedient to have the plunger and the table move in unison with respect to the container 9 as in this manner the brick 32 has to move but a short distance before it rests on the surface of the table. Any pronounced drop would tend to disrupt portions of the brick and destroy its regular shape.

As the table begins to lower, latch 53 is released to permit the key and keyway 52 and 56 to disengage. One face of latch 53 is inclined, as shown particularly in Fig. 5, to cooperate with a wedge 81 carried on arm 79. As the arm drops with table 69, the withdrawal of wedge 81 permits a spring 82 to retract the latch 53 thereby permitting lateral movement of the container 9. The driver 78 in the meantime has forced the plunger downwardly until the upper head 27 rests upon the rim of the sides 11. The entire brick 32 is then resting upon the table, and the container 9 is empty. At this juncture, projecting pins 83 of the second series secured to chains 66 advance and engage the container sides 11 carrying the container transversely of the machine to be reassembled with the bottom plate 12 retained in the depressed portion 68. The container is then in its original condition and can either be returned directly to the starting point or can be thoroughly washed and sterilized prior to being returned to the starting point for further use.

The table is free of both bottom 12 and walls 11 and is clear to accommodate the next container. The table lowers sufficiently to permit of the brick being discharged laterally therefrom and to effect the discharge of the brick I have equipped the table with a pair of rollers 84 and 85 which are journaled in the framework of the table and carry a belt 86 coinciding with the table surface. The rollers are driven thru gearing 87 joined by a sliding connection 88 to a pair of gear wheels 89 driven by the cam shaft 77. The table and its associated mechanism and the conveyor are synchronously driven by the electric motor 20.

Overlying the belt 86 on the rollers is a strip of wrapping material 91 which is derived from a roll 92 of wrapping material suitably supported on the framework of the machine. The roll is incapable of feeding the wrapping material, which preferably is cellophane or a similar substance, and I therefore provide a feed roll 93 journaled in the framework of the machine and driven thru gears 94 and 96 rotated by the gears 89. The circumference of the feed roll is preferably equal to the linear amount of wrapping material desired to be fed onto the table surface 71 while the action of the feed roll is abetted by a contacting roll 97 rotatably mounted in the framework of the machine. The material 91 passes between guide surfaces 98 adjacent a knife edge 99 secured to the framework of the machine and is fed onto the surface of the table in the lowermost position of the table. As the table ascends, a knife edge 101 which is carried by it is brought into cooperation with the knife edge 99 and severs the wrapping material adjacent the edge of the table. A sheet of wrapping material is thereby cut from the strip and lies on the belt forming part of the surface 71 of the table. When the table reaches its uppermost position, and again starts down, a brick of fruit is discharged onto the sheet of wrapping material. As the table reaches its lowest position, the belt 86 is advanced by means of rotational movement of the rollers 84 and 85, and discharges the wrapping material together with the brick to one side of the machine where it can be suitably wrapped.

It will be appreciated that I have provided a machine which initially receives warm fruit to be pressed, presses and cools it in containers the size of a finished brick, and expresses it from the containers without disruption onto a sheet of wrapping material expressly cut for that purpose and finally discharges the brick from the machine ready for subsequent wrapping. During the entire progress of the fruit thru the machine, it is exposed to the atmosphere but a very few seconds and that is after it leaves the container and until it is passed to the wrapping device. The containers themselves are available for sterilization and cleaning between each fruit receiving operation and the entire process is carried on automatically.

I claim:

1. In a fruit pressing machine, a platform having an aperture therein, a stop on said platform adjacent said aperture, a conveyor for positioning a container proximate said aperture, and means for causing said container to register with said aperture by abutting said stop.

2. In a fruit pressing machine, a platform, a stop on said platform, means for causing a container to abut said stop, and means for holding said container against said stop.

3. In a fruit pressing machine, a platform, a stop on said platform for constraining advancing movement of containers discharged onto said platform, means for constraining retreating movement of said containers, and means for constraining lateral movement of said containers.

4. In a fruit pressing machine, a platform, a container adapted to be positioned on said platform, a key on said container, a keyway on said platform for piloting said container by means of said key, and latches on said platform cooperating with said keyway to position said container.

5. In a fruit pressing machine, a platform, a container, a conveyor for discharging said container onto said platform, means for accurately positioning said container longitudinally of said platform, latches for restraining longitudinal retreat of said container, a key, and a cooperating keyway for restraining lateral displacement of said container on said platform.

6. In a fruit pressing machine, a platform, means for periodically discharging a container onto said platform, means for positioning said container on said platform, means for restraining said positioned container against lateral displacement, and means for periodically rendering said restraining means ineffective.

7. In a fruit pressing machine, a platform, means for periodically positioning and holding a container on said platform, and means for periodically removing said container from said platform.

8. In a fruit pressing machine, a platform having an aperture therein, a plurality of containers, a removable bottom on each of said containers, means for registering one of said containers with said aperture, means for removing the bottom from each of said containers, a plunger adapted to be depressed to expel the contents of said registered bottomless container through said aperture, and means for removing said bottomless container from said platform.

9. In a fruit pressing machine, a platform having an aperture therein, a plurality of containers, a removable bottom on each of said containers, means for registering one of said containers with said aperture, means for removing the bottom from said registered container, and means for removing the remainder of said registered container from said platform and assembling said remainder with the removed bottom.

10. In a fruit pressing machine, a plurality of containers, a removable bottom on each of said containers, means for successively stripping the bottom from each of said containers, means for discharging the contents of each container from which the bottom has been removed, and means for reassembling said bottomless container.

11. In a fruit pressing machine, a plurality of containers, a removable bottom on each of said containers, means for successively stripping the bottom from each of said containers, and means for discharging the contents of each container from which the bottom has been removed.

12. In a fruit pressing machine, a plurality of containers, movable over a path, a removable bottom on each of said containers, a plunger in each of said containers, means for stripping the bottom from each of said containers, means for depressing each of said plungers, and means for reassembling said containers.

13. In a fruit pressing machine, a platform, a container on said platform, a table adjacent said platform, means for expelling the contents of said container onto said table, and means on said table for discharging said contents therefrom.

14. In a fruit pressing machine, a reciprocating table upon which a sheet wrapping material can be positioned, means for expelling a fruit brick onto a positioned sheet of said material, and means for discharging the positioned sheet of said material and said brick together from said table.

15. In a fruit pressing machine, a framework, a table adapted to be reciprocated in said framework, means for feeding a strip of wrapping material onto said table, to receive a fruit brick, and means effective during the reciprocation of said table for severing a sheet from said strip, and means for discharging said sheet and the fruit brick from said table.

16. In a fruit pressing machine, a framework, a conveyor on said framework, a container on said conveyor adapted to receive a hot moist fruit, means for pressing the contents of said container, and means for cooling the contents of said container so as to form a fruit block held together in a coherent definite form.

17. In a fruit pressing machine, a framework, a platform on said framework, a plurality of containers, a removable bottom on each of said containers, means for positioning each of said containers on said platform, means for stripping the bottom from said positioned container, a reciprocating table adjacent said platform, means for expelling the contents of said positioned container onto said table during the reciprocation thereof, means for reassembling said positioned container, and means for removing said expelled contents from said table.

18. In a fruit pressing machine, a framework, a platform on said framework, said platform having an aperture therein, a plurality of containers for fruit to be pressed, a removable bottom on each of said containers, means for registering each of said containers successively with the aperture in said platform, means for stripping the bottom from each of said containers, a table beneath said platform, and means for expelling said pressed fruit through said aperture onto said table from the bottomless container.

19. In a fruit pressing machine, a framework, a conveyor on said framework, a platform on said framework, said platform having an aperture therein, a plurality of containers adapted to be successively discharged onto said platform by said conveyor, a removable bottom on each of said containers, means for retaining each of said containers successively in registry with said aperture, means for stripping the bottom from each of said containers, means for expelling the contents of said registered container, and means for receiving said expelled contents on wrapping material.

20. In a fruit pressing machine, a framework, a runway on said framework, a plurality of containers on said runway, a conveyor for advancing said containers in succession, a plunger in each of said containers, an inclined surface on said framework for cooperating with each of said plungers to press the contents thereof, a platform having an aperture therein mounted on said framework, means for positioning each of said containers successively in registry with said aperture, means for retaining said positioned container in registry with said aperture, a removable bottom on each of said containers, means for stripping said bottom from each of said registered containers, a table adapted to underlie said aperture, and means for depressing the plunger in each container to expel the contents of each of said bottomless containers onto said table.

21. In a machine for handling units of produce, a plurality of containers for said produce, a removable bottom on each of said containers for confining said produce, means for removing said bottom from each of said containers, a reciprocable table for receiving said produce, and a plunger reciprocable in unison with said table for expelling said produce from each of said containers onto said table after the bottom has been removed from each of the said containers.

In testimony whereof, I have hereunto set my hand.

FREDERICK M. EATON.